Figure 1:
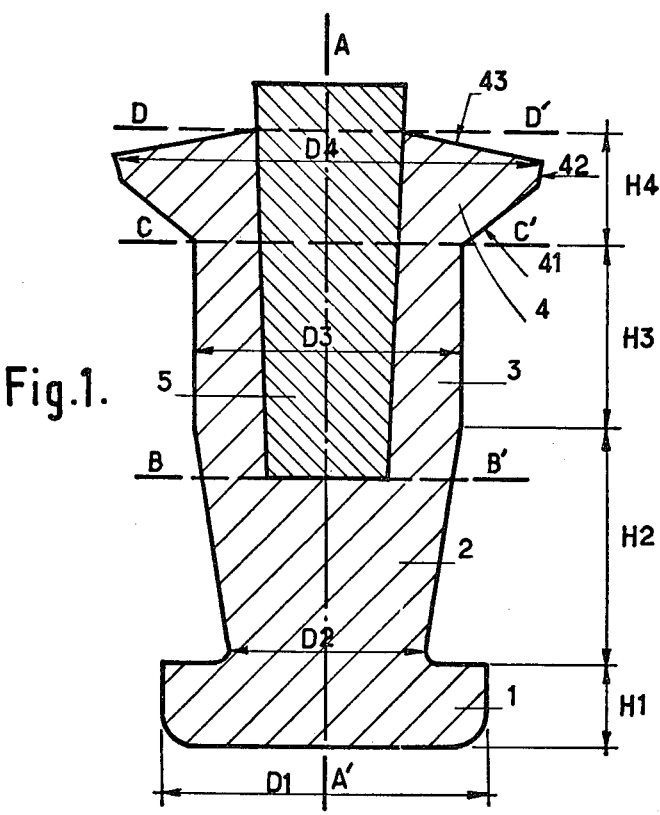

United States Patent [19]
Walrave et al.

[11] 3,987,831
[45] Oct. 26, 1976

[54] ANTI-SKID STUD FOR PNEUMATIC VEHICLE TIRES

[75] Inventors: Jean Walrave, Meylan; Jean Champiot, Seyssins, both of France

[73] Assignee: Ugine Carbone, Grenoble, France

[22] Filed: July 1, 1975

[21] Appl. No.: 592,350

[30] Foreign Application Priority Data
July 19, 1974  France .............................. 74.25147

[52] U.S. Cl. ............................... 152/210; 152/167
[51] Int. Cl.² ......................................... B60C 11/16
[58] Field of Search ........... 152/210, 211, 212, 167, 152/168, 169; 36/59 B, 62

[56] References Cited
UNITED STATES PATENTS

| | | | |
|---|---|---|---|
| 3,837,386 | 9/1974 | Lejeune | 152/210 |
| 3,842,880 | 10/1974 | Keinanen | 152/210 |

FOREIGN PATENTS OR APPLICATIONS

| | | | |
|---|---|---|---|
| 515,982 | 12/1952 | Belgium | 152/210 |
| 1,256,285 | 11/1961 | France | 152/210 |
| 9,590 | 9/1912 | United Kingdom | 152/210 |

*Primary Examiner*—Drayton E. Hoffmann
*Attorney, Agent, or Firm*—Dennison, Dennison, Meserole & Pollack

[57] ABSTRACT

Anti-skid stud for road vehicle tires composed of a tungsten carbide rod enclosed in a sleeve.

This sleeve, made of a plastic material, has a cylindrical or frustoconical stem with at least one flange flush with the tread, the diameter of the flange being greater than the largest diameter of the rest of the sleeve.

This arrangement provides a high degree of stability of the projection of the carbide rod beyond the tire tread throughout the period of use.

8 Claims, 4 Drawing Figures

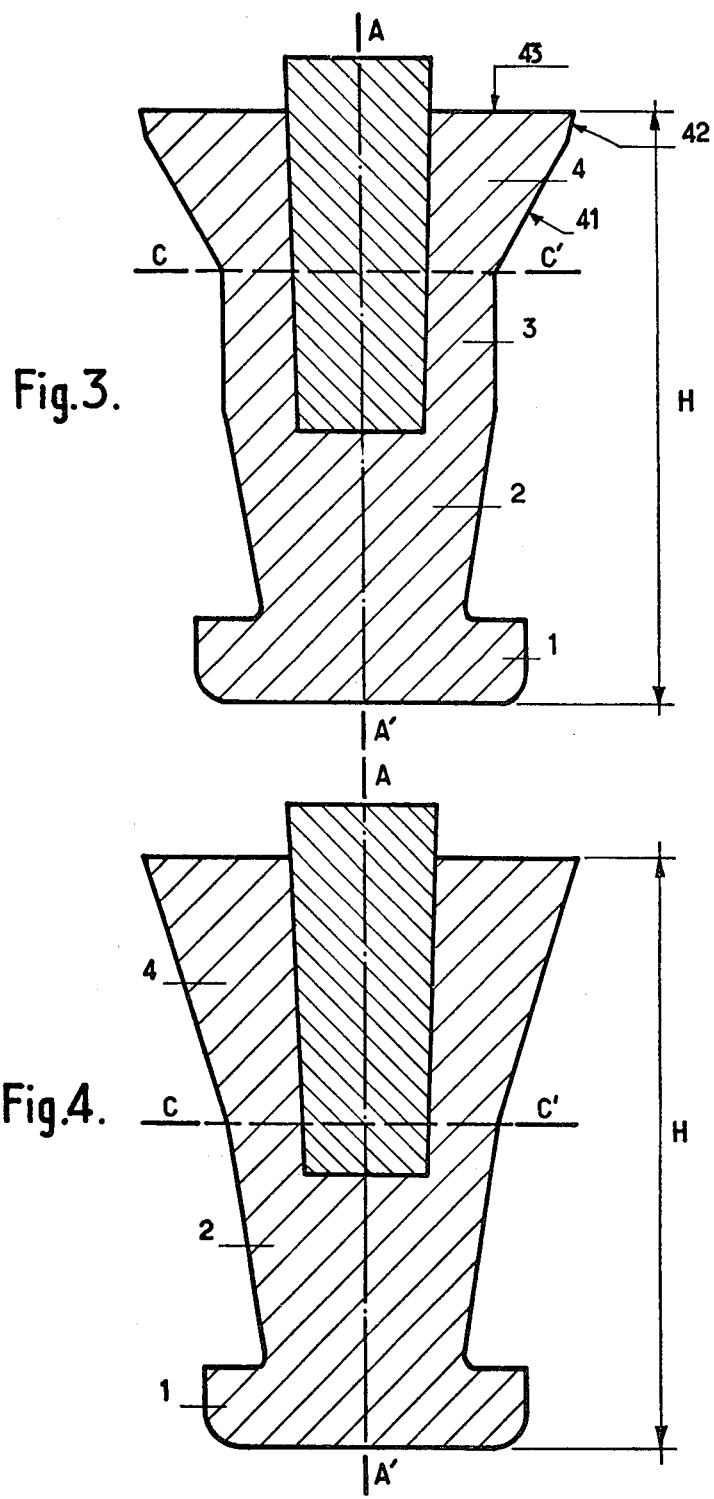

ANTI-SKID STUD FOR PNEUMATIC VEHICLE TIRES

The present invention is concerned with a new type of stud designed to be fitted in the tread of the pneumatic tires of road vehicles, in order to improve their grip on icy roads, these studs offering throughout the whole of the period of their use a high degree of stability in their operational characteristics, i.e. good positioning in the tire, and a virtually constant height of projection above the tread.

For a long time, research has been focused on devising studs which would improve the grip on snow covered roads. In the last few years, snow removal and road salting have become widespread and considerable progress has been made in the perfection of rubbers and special profiles for snow to a point where this problem has largely been solved by the inherent characteristics of the tires as regards snow, whether packed or otherwise. On the other hand, considerable risks still exist due to occasional black ice, which is unpredictable and invisible, and to frozen snow. Therefore, it was still necessary in such cases to use studs, but of a different type both in form and material, which would not affect the grip of the tire on a dry road and which would not involve the acceptance of any appreciable deterioration of the road network.

Generally speaking, a stud is composed of a sleeve comprising a chamber housing a rod of a hard material, usually tungsten carbide.

The use of steel for the sleeve, which was customary until recently, has been questioned as it involved a number of difficulties. In the event of the stud being driven inwards, its base might come into contact with the fabric or the casing of the tire and might even at high speed cause it to blow out. Moreover, in the event of the carbide rods being ripped out or worn away, the sleeves left behind can bring about a reduction of the tire grip on a dry road.

These considerations have led manufacturers to propose sleeves in other materials, and in particular in plastics, such materials being intended to retain their physical and mechanical properties from −40° C to +150° C whilst maintaining a proper grip on the carbide rod.

The sleeves are generally constituted by an approximately cylindrical tube with a diameter of substantially 5 mm, which results in a stud of very low weight, of the order of 1 gram. This substantial reduction in weight relative to former types of studs, which were much too heavy, permits the reduction to manageable proportions of wear on the road surface and thus the avoidance of prohibitions by the public authorities. Obviously, one cannot go too far in the reduction of the diameter of the tube because of the risk of breakage, either by the carbide rod being driven in or in the course of use.

In order to improve the anchorage of the sleeve in the tire rubber, to maintain the stable orientation of the stud throughout the period of its use and to avoid any risks of loosening, the periphery of the tube may be fitted with grooves or flanges located at its base or at different intermediate levels. These flanges must slightly exceed the diameter of the tube since otherwise they exert excessive pressure on the road surface.

Known studs of this type comprising a plastic sleeve with a practically cylindrical tube and possibly grooves or flanges have in use revealed behavior which could be dangerous to the user. Indeed, instead of the projection of the carbide rod stabilizing after a running-in period of a few tens of kilometers of use, an abnormal and unexplained sinking of the rod takes place between approximately 80 and 1000 km, which can reach 50% of the figure for projection after running in, after 1000 km returning to a value close to that of projection after running in.

After a long period of test, we have found a way to avoid this difficulty which seriously affects the effectiveness of the stud in this critical area of use and compromises the safety which the user expects from it.

The stud according to the invention comprises a carbide rod encased in a molded sleeve which is self-destructible in operation, the sleeve being constituted by a tube composed of cylindrical and/or cone-shaped parts and of at least one upper flange, flush with the tire tread, characterized in that the greatest diameter of this flange is always larger than the greatest diameter of the rest of the sleeve.

The tube may be cylindrical or cone-shaped, with the smaller base towards the bottom, i.e. towards the interior of the tire. It may be composed of an assembly of a variable number of cylinders and truncated cones and include at its periphery grooves, furrows, or flanges, located either at the base or at an intermediate level, or any other known device which permits an improvement of the anchorage of the stud in the tire rubber.

In every case, this is topped by an upper flange, which is flush with the tire tread and whose largest diameter is greater than all the flange diameters measured in an axis perpendicular to the axis of the stud, at any level below this flange. This largest diameter of the sleeve below the upper flange is generally between 4 and 8 mm.

The upper flange may be of any desired shape but it is advantageous if it is frustoconical with its small base towards the interior of the tire, or composed of an assembly of cone sections, the cone sections in contact with the rubber of the tire also having their small bases towards the interior of the tire.

The largest diameter of the upper flange, measured in a plane perpendicular to the axis of the stud, is preferably between 1.2 and 1.5 times the largest diameter of the sleeve below this flange.

Below 1.2 times, the effectiveness of the upper flange would be insufficient to ensure the stability in use which is sought. Above 1.5 times, there would be an occurrence of road wear phenomena and poor behavior on dry roads.

The total height H of the sleeve is preferably between 9 and 17 mm. The height of the upper flange may be larger or smaller but it must not exceed 0.5H. It is generally between 0.1H and 0.5H and preferably between 0.2H and 0.5H.

The various possible shapes for the studs according to the invention will be better understood from a numerical description using the attached illustrations which are merely non-limitative examples.

FIG. 1 shows a stud in section along the axis AA', the lower part of which for example displays a base flange 1 and a truncated cone portion 2 with its small base downwards. The upper part of the sleeve comprises a cylindrical portion 3 and an upper flange 4 composed of three cone frusta 41, 42, 43 of which the cone frusta 41 and 42 have their small bases downwards and the upper cone frustum 43 has its small base upwards following the plane of section DD'.

It will be seen that the diameter D4 of the flange 4 which is flush with the tread 43 is greater than the diameters at all other section levels of the sleeve below CC' and in particular greater than the diameter D1 of the base flange 1.

The sleeve includes a chamber of the same shape as the rod 5 which is forced into it without an air space at the bottom. The rod 5 itself is generally cylindrical or frustoconical with the small base downwards. It may have a flat base represented by the section BB' or be extended below by a point permitting easier penetration.

Figure 2:
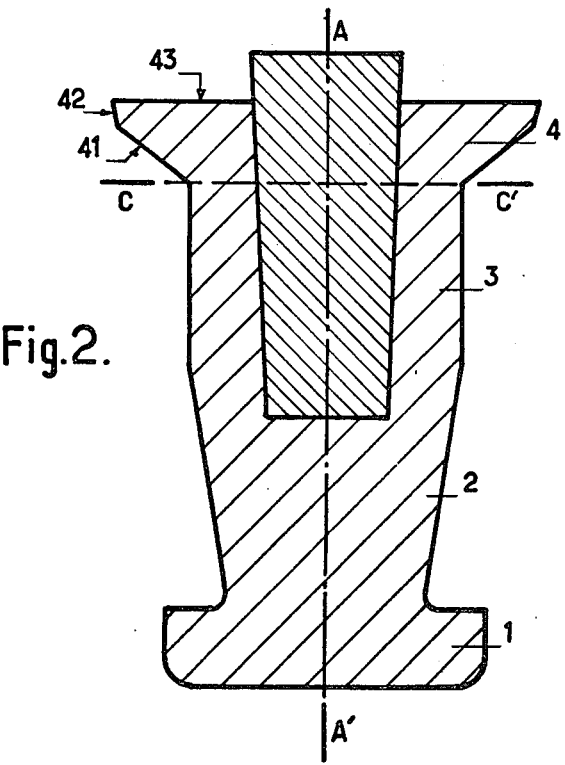

FIGS. 2 and 3 represent two variants in which the upper flange 4 is of a slightly different shape as its upper surface 43 is flat and thus this flange is formed only by two cone frusta 41 and 42 with their small bases downwards.

FIG. 4 represents another variant in which the upper flange 4 is very high as it is in the form of a large cone frustum of which the small base as shown in section CC' is located very slightly above the level H/2. The large base of this truncated cone clearly has a larger diameter than that of any section located below the level CC'.

The material chosen for the manufacture of the sleeve must satisfy the requirements mentioned previously, namely constant physical and mechanical characteristics from −40° C up to +150° C approximately, and be able properly to grip the carbide rod, without using any gluing, welding or crimping which might prevent the ejection of the rod after 10,000 to 20,000 km. In addition, the characteristics of this material must resemble those of the tire rubber. It is advantageous to select a material the Shore hardness of which is between three and five times greater than that of the tire rubber. This can be moldable thermoplastic material such as a polyamide, the softening point of which is not less than 150° C.

In these conditions, it is found that the sleeve is self-destructible in operation, i.e. that it wears away at the same time as the tread and the carbide rod.

Experience shows that the combination of the shape and the material of the sleeve make the projection of the carbide rod beyond the tread stabilize in the first 80 kilometers of use and it remains virtually constant until it automatically eliminates itself, this applying uniformly to all the studs in any one tire, after a certain number of kilometers varying from 10,000 to 20,000 km depending on the vehicle, the tire and the style of driving. By this stage, the sleeve has been worn away in such a way that on a dry road the tires provide grip comparable to that obtained from non-studded tires with the same degree of tread rubber wear. Thus, the abnormal behavior of studs of the same type without an upper flange has disappeared.

The studs according to the invention can be fitted to all types of cross-ply or radial tires and for all types of vehicles: private cars, heavy goods vehicles, etc.

EXAMPLE

Studs were produced with the sleeve in molded polyamide (technyl nylon type) with a shape analogous to that shown in FIG. 1 and defined by the following dimensions:

| | |
|---|---|
| diameter $D_1$ of the base flange 1 | 6 mm |
| diameter $D_2$ at the base of the tube | 4 mm |
| diameter $D_3$ of the cylindrical part 3 of the tube | 5 mm |
| diameter $D_4$ of the upper flange | 8 mm |
| total height of the sleeve H | 12 mm |
| height of the cylindrical part 3 | H3 3 mm |
| height of the upper flange 4 | H4 3 mm |
| height of truncated cone 41 | 1.7 mm |
| height of truncated cone 42 | 0.5 mm |
| height of truncated cone 43 | 0.8 mm |
| carbide rod cone frustum | |
| height | 7 mm |
| upper diameter | 2.6 mm |
| lower diameter | 2.2 mm |

Studs of this type were fitted to radial snow tires on a private car, the number being 140 per tire and were subjected to a wearing test between 0 and 15,000 km. By means of the periodic measurement of the height of projection of the rod above the tread for a certain number of studs on the same tire and then taking the average, the following results were obtained, comparing the studs according to the invention with control studs manufactured from the same material, having the same dimensional characteristics and fitted under the same conditions, but not including the upper flange.

| Projection mm km | Studs according to the invention | Control studs |
|---|---|---|
| 0 | 1.6 | 1.6 |
| 80 | 1.2 | 1.2 |
| 150 | 1.2 | 1 |
| 300 | 1.2 | 0.6 |
| 500 | 1.2 | 0.8 |
| 1,000 | 1.2 | 1 |
| >1,200 | 1.2 | 1.2 |

The comparison during road tests of the studs according to the invention with the control studs shows up a stability in the projection of the stud over a period of time which it was not previously possible to achieve with this type of stud.

We claim:

1. For use in road vehicle tires incorporating an outer road surface engaging tread, an anti-skid stud comprising a carbide rod enclosed in a sleeve made of a material which is self-destructible in operation, said sleeve being a single tube composed of cylindrical and/or frustoconical components, and an upper flange, said sleeve being anchorable completely within the tire with the upper flange having an outer face flush with the tire tread, the greatest diameter of said flange being larger than the greatest diameter of the remainder of the sleeve, said rod having an outer end projecting centrally outward from the outer face of said upper flange, the self-destructible nature of the material of the sleeve providing a stability in the projection of the stud throughout the wear life thereof.

2. A stud in accordance with claim 1 wherein the part of the flange inward of the outer face is formed of a truncated cone or of an assembly of truncated cones with the small base pointed towards the interior of the tire.

3. A stud in accordance with claim 1 wherein the greatest diameter of the upper flange is between 1.2 and 1.5 times the greatest diameter of the rest of the sleeve.

4. A stud in accordance with claim 3 wherein the greatest diameter of the sleeve below the upper flange is between 4 and 8 mm.

5. A stud in accordance with claim 4 wherein the total height H of the sleeve is between 9 and 17 mm.

6. A stud in accordance with claim 5 wherein the height of the upper flange is between 0.1H and 0.5H.

7. A stud in accordance with claim 1 wherein the material used for the sleeve is a moldable thermoplastic material, the softening point of which is higher than 150° C.

8. A stud in accordance with claim 7 wherein the material used for the sleeve has a Shore hardness between about 3 to 5 times that of the rubber of the tire in which it is fitted, providing wear characteristics whereby the sleeve will wear at substantially the same rate as the tire tread.

* * * * *